United States Patent

McCaully et al.

[15] 3,689,557
[45] Sept. 5, 1972

[54] PHENETHYLAMIDES

[72] Inventors: Ronald J. McCaully, Malvern; George L. Conklin, Marvertown, both of Pa.

[73] Assignee: American Home Products Corporation, New York, N.Y.

[22] Filed: June 9, 1969

[21] Appl. No.: 831,725

[52] U.S. Cl............260/559 B, 260/490, 260/501.1, 260/501.21, 260/562 R, 260/562 A, 424/324
[51] Int. Cl.............................................C07c 103/38
[58] Field of Search.....................260/562, 472, 559

[56] References Cited

UNITED STATES PATENTS 3,502,679   3/1970   Houlihan et al. ..........260/562

OTHER PUBLICATIONS

Shapiro et al., J. Am. Chem. Soc., Vol. 81, p. 6322–29 (1959).
Moore et al., J. Am. Chem. Soc., Vol. 76, p. 3656–62 (1954).
Kametan et al., Chemical Abstracts, Vol. 54, Col. 1517g–h (1960).
Bennington, Chem. Abstracts, Vol. 55, Col. 18727–18728 (1961).
Bhattacharya, Chem. Abstracts, Vol. 70, article 28800e (1969).
Spath et al., Monatschafte Chimie, Vol. 51, p. 190–204 (1928).
Nerdel et al., Chemical Abstracts, Vol. 53, Col. 21785 (1959).

*Primary Examiner*—Henry R. Jiles
*Assistant Examiner*—Harry I. Moatz
*Attorney*—Joseph Martin Weigman

[57] ABSTRACT

Novel chloro- or alkoxy-substituted phenethylamides, optionally substituted on the nitrogen by alkyl and containing an alkyl-, an alkanoyloxyalkyl-, a hydroxyalkyl- or a diphenoxyalkylacylamino group (I) are pharmacologically active as bronchodilators and as central nervous system depressants. Compounds (I) are provided by (a) acylating a substituted phenethylamine (II) with a reactive derivative, e.g., halide or anhydride, of an alkanoic, alkanoyloxyalkanoic, hydroxyalkanoic, or diphenoxyalkanoic acid (III) or (b) dealkanoylating an alkanoyloxy alkyl compound (Ia) to provide the corresponding hydroxyalkyl compound (Ib).

3 Claims, No Drawings

PHENETHYLAMIDES

This invention relates to novel phenethylamide compounds with valuable pharmacological properties. More particularly, it is concerned with chloro- or alkoxyphenethylamides, optionally substituted on the nitrogen with alkyl, and containing an alkyl-, an alkanoyloxyalkyl-, a hydroxyalkyl- or a diphenoxymethylacylamino group. These compounds exhibit bronchodilating activity and central nervous system depressant activity in standard pharmacological tests when administered to warm-blooded laboratory animals.

DESCRIPTION OF THE INVENTION

The compounds contemplated by this invention are selected from those of Formula I:

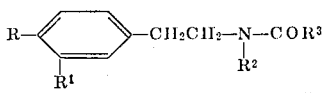
 I wherein R is chloro and $R^1$ is hydrogen or R and $R^1$ are (lower)alkoxy; $R^2$ is hydrogen or (lower)alkyl; and $R^3$ is (lower)alkyl, (lower)alkanoyloxy(lower)alkyl, hydroxy(lower)alkyl or diphenoxymethyl, provided, however, that when R and $R^1$ are (lower)alkoxy and $R^3$ is hydroxymethyl or (lower)alkyl, $R^2$ is other than hydrogen, and non-toxic, acid addition salts thereof.

Special mention is made of a family comprising an especially valuable sub-generic aspect of this invention. These are compounds of Formula I wherein: R is chloro and $R^1$ is hydrogen or R and $R^1$ are methoxy; $R^2$ is hydrogen or methyl; and $R^3$ is methyl, acetoxymethyl, hydroxymethyl or diphenoxymethyl, provided, however, that when R and $R^1$ are methoxy and $R^3$ is hydroxymethyl or methyl, $R^2$ is other than hydrogen.

Also valuable embodiments of this invention are the following:

N-(3,4-dimethoxyphenethyl)-N-methylacetamide, and its hydrochloride;
N-(3,4-dimethoxyphenethyl)-2-hydroxyacetamide;
N-(4-chlorophenethyl)-2-hydroxyacetamide, acetate;
N-(4-chlorophenethyl)-2-hydroxyacetamide; and
N-(3,4-dimethoxyphenethyl)glyoxylamide, diphenylacetal, i.e., a compound of Formula I wherein R and $R^1$ are methoxy, $R^2$ is hydrogen and $R^3$ is diphenoxymethyl.

With reference to Formula I and the definition of the substituents, "(lower)alkoxy" contemplates hydrocarbon alkoxy groups, straight chain and branched of from about one to about six carbon atoms, illustrative members of which are methoxy ethoxy, n-propoxy, i-propoxy, n-butoxy, t-butoxy, n-pentyloxy, n-hexyloxy and the like; methoxy is preferred. The term "(lower)alkyl" contemplates hydrocarbon substituents of from about one to about six carbon atoms, straight chain and branched, illustrative members of which are methyl, ethyl, n-propyl, i-propyl, n-butyl, t-butyl, n-pentyl, 2-methylpentyl, n-hexyl and the like; the methyl group is preferred. The term "(lower)alkanoyloxy(lower)alkyl" contemplates (lower)alkyl groups, as defined above, mono-substituted with alkanoyloxy groups of from about two to about six carbon atoms, illustrative members of which are acetoxy, n-propionyloxy, i-propionyloxy, n-butyroyloxy, n-pentanoyloxy, n-hexanoyloxy, and the like; a preferred (lower)alkanoyl(lower)alkyl group is the acetoxymethyl group. The term "hydroxy(lower)alkyl" contemplates (lower)alkyl groups, as above defined, monosubstituted with hydroxy; a preferred group is the hydroxymethyl group.

The compounds of Formula I hereinabove are prepared by a process comprising a. condensing a phenethylamine of FORMULA II:

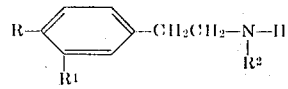
 II wherein R, $R^1$ and $R^2$ are as above defined with a reactive derivative, e.g., halide or anhydride, of an acid of Formula III

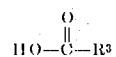
 III wherein $R^3$ is as above defined; or b. dealkanoylating a compound of Formula Ia

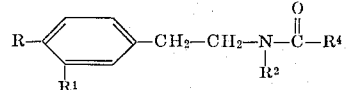
 Ia wherein R, $R^1$ and $R^2$ are as above defined and $R^4$ is (lower)al-kanoyloxy(lower)alkyl, until formation of a compound of Formula Ib:

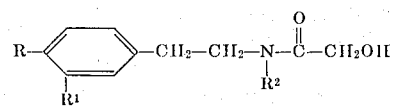
 Ib wherein R, $R^1$ and $R^2$ are as hereinabove defined, is substantially complete.

To carry out the procedure designated step (a), the phenethylamine (II) can be mixed with about an equal weight of sodium bicarbonate about four parts by weight of ice, about four parts by weight of water and about nine parts by weight of methylene chloride. To the vigorously stirred mixture then is added dropwise at least the stoichiometrical amount of the acylating agent, preferably an acyl halide, dissolved in about five parts of methylene chloride (based on phenethylamine). After about 1 hour, the reaction is substantially complete. In one manner of recovering the product the organic layer is separated, washed with dilute acid, dilute base, water; dried and evaporated to leave the product (I) as a residue.

To carry out the procedure, designated step (b), the alkanoate (Ia) is reacted with an aqueous base preferably at a somewhat elevated temperature, e.g., about 90°C. In one manner of proceeding, a slurry of the alkanoate (Ia) in about 12 parts of 50 percent aqueous ethanol is heated with about one/fourth part by weight of sodium hydroxide and 1.5 parts by weight of water on a stream bath for about 1.5 hours. The product (Ib) can be recovered in any convenient manner. One way of doing so is to concentrate the reaction mixture to about one-half its volume in a vacuum then to dilute the concentrate with about an equal volume of water. Extraction with ether, followed by washing, drying and evaporating the extract will leave the product of Formula Ib as a residue. These procedures and the others disclosed hereinabove will be exemplified in detail hereinafter.

The starting materials of Formulas II and III are readily available or can be obtained by techniques familiar to those skilled in the art.

Illustrative of important starting materials of Formula II are:

3,4-dimethoxyphenethylamine, C.A. 43, 1026*b;*

4-chlorophenethylamine, C.A. 43, 7486*g;* and N-methyl-3,4-dimethoxy phenethylamine, C.A. 50, 9316*d.*

Illustrative of important starting materials of Formula III are:

acetoxyacetyl chloride and
diphenoxyacetyl chloride

The compounds of Formula I and salts of this invention have demonstrated pharmacological activity. In particular they have been found to exert a depressant action on the central nervous system when tested under standard and accepted pharmacological procedures in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents, such as the need to induce a calming effect.

The compounds of Formula I of this invention have been found to act as bronchodilators when tested under standard and accepted pharmacological test procedures in animals, e.g., cats and guinea pigs. They are, therefore, deemed to possess utility in experimental and comparative pharmacology and are of value to treat conditions in animals, such as valuable domestic animals, and in laboratory animals, such as mice, rats, guinea pigs, and the like, responsive to treatment with bronchodilating agents, such as the symptoms of asthma and the broncho-restrictive effects of histamine-like compounds.

The compounds of Formula I of this invention may be administered either alone or in combination with other pharmacologicaly active ingredients. Whether singly or in combination, they may be used in the form of solid compositions for oral administration combined, if desired, with extenders or carriers that are relatively non-toxic or inert. They may be put into tablet, capsule or powder form. On the other hand, they may be administered in liquid form as a suspension of solution in a suitable vehicle for parenteral use. As will be illustrated hereinafter, useful pharmacological action as central nervous system depressant agents will be demonstrated if the active ingredient is supplied to mice at dosages of 12.7, 40, 127 and 400 mg./kg. of body weight.

For bronchodilating purposes, in addition to the above means of administration, resort can be had to inhalation of aerosols or of solutions, e.g., 1:100 or 1:200, or of powders, e.g., 10 percent or 25 percent active ingredient. As will be illustrated hereinafter, useful pharmacological action as bronchodilating agents will be demonstrated if the active ingredient is supplied to guinea pigs in dosages of 25 and 50 mg./kg. of body weight.

The term "non-toxic, acid addition salts" contemplates pharmacologically acceptable salts of the instant compounds with organic and inorganic acids, illustrative salts being, for example, hydrobromides, hydrochlorides, sulphates, phosphates, acetates, methanesulfonates, citrates, malates, pamoates, and the like. They are prepared by standard techniques such as by mixing the compounds of Formula I (which are basic) with the appropriate acid in a solvent, such as acetone or isopropanol, and evaporating to leave the salt as a residue, or by other methods to be exemplified herein.

DESCRIPTION OF THE PREFERRED EMBODIMENTS

The following examples are given by way of illustration and are not to be construed as limitations of this invention, many variations of which are possible without departing from the scope and spirit thereof.

EXAMPLE 1

N-(3,4-dimethoxyphenethyl)-2-hydroxy acetamide, acetate

A chilled vigorously stirred mixture of 18 g. of sodium bicarbonate, 80 g. of ice, 80 ml. of water and 18.1 g. of 3,4-dimethoxy-phenethylamine in 120 ml. of methylene chloride is treated dropwise with a solution of 17 g. of acetoxyacetyl chloride in 80 ml. of methylene chloride. After the addition is complete, the reaction is stirred for one hour. The methylene chloride layer is separated and washed successively with 4 percent hydrochloric acid, 10 percent sodium bicarbonate solution, and water. The methylene chloride solution is dried (MgSO$_4$) and evaporated to an oil. On long standing the crystals that separate spontaneously from the oil are slurried in ether and filtered. Filtration affords 11.57 g. of N-(3,4-dimethoxyphenethyl)-2-hydroxyacetamide, acetate, m.p. 62–65°C.

Anal. Calcd. for $C_{14}H_{19}NO_5$:  C, 59.78;  H 6.81;  N 4.98.
Found:  C, 59.61;  H, 6.70;  N, 4.69.

EXAMPLE 2

N-(p-Chorophenethyl)-2-hydroxyacetamide, acetate

A chilled, stirred mixture of 27 g. of sodium bicarbonate, 40 g. of ice, 140 ml. of water, 200 ml. of methylenechloride and 25 g. of p-chlorophenethylamine is treated dropwise with a solution of acetoxyacetylchloride in 150 ml. of methylene chloride. After the addition is complete, the mixture is stirred for one hour. The methylene chloride layer is washed successively with 4 percent hydrochloric acid, 10 percent sodium bicarbonate solution and water and is dried over magnesium sulfate. Evaporation of the solvent on a rotary evaporator affords a white solid. Recrystallization of the solid affords 35 g. of N-(p-chlorophenethyl)-2-hydroxyacetamide, acetate, m.p., 99–101° C.

Anal. Calcd. for $C_{12}H_{14}ClNO_3$:  C, 56.37; H, 5.52; Ll, 13.86; N, 5.48
Found:  C, 56.62; H, 5.11; Cl, 13.88; N, 5.23

EXAMPLE 3

N-(p-Chlorophenethyl)-2-hydroxy-acetamide

A slurry of 15.0 g. of N-(p-chlorophenethyl)-2-hydroxy-acetamide, acetate in 200 ml. of 50 percent aqueous is treated with a solution of 2.6 g. of sodium hydroxide in 25 ml. of water and the mixture is heated for 1.5 hr. on a steambath. The solvent is evaporated in vacuo to a volume of 100 ml. and then diluted with 250 ml. of water. The mixture is extracted with ether. The ether extract is washed with water, dried (MgSO$_4$), and evaporated on a rotary evaporator. The residue is slurried with a small portion of ether and the solid that separates is filtered and washed with a small portion of ether to give 5.7 g. of N-(p-chlorophenethyl)-2-hydroxyacetamide, m.p., 70–73°C.

Anal. Calcd. for C$_{10}$H$_{12}$ClNO$_2$:   C, 56.21; H, 5.66; Cl, 16.59; N, 6.55
Found:   C, 56.19; H, 5.60; Cl, 16.74; N, 6.37

EXAMPLE 4

N-(3,4-Dimethoxyphenethyl)glyoxyl-amide, diphenylacetal

From the reaction of 10 g. of diphenoxyacetyl chloride with 6.0 g. of 3,4-dimethoxyphenethylamine, under the reaction conditions of Example 1, N-(3,4-dimethoxyphenethyl)glyoxylamide, diphenylacetal (5.6 g., m.p., 94–96°C.) is prepared. The analytical sample is recrystallized from cyclohexane.

Anal. Calcd. for C$_{24}$H$_{25}$NO$_5$:   C, 70.74, H, 6.18.
Found:C, 70.72; H, 5.89.

EXAMPLE 5

N-(3,4-Dimethoxyphenethyl)-N-methylacetamide and Hydrochloride

A solution of 60.0 g. of 3,4-dimethoxy-N-methyphenethyl-amine, hydrochloride in 400 ml. of water is made basic with 80 g. of 50 percent sodium hydroxide solution and extracted with five portions of methylene chloride. The extract is dried (MgSO$_4$) and evaporated to leave a residue of 32.2 g. of 3,4-dimethoxy-N-methylphenethylamine as an oil. The oil dissolved in 100 ml. of acetic anhydride is heated for one hour on a steam bath. Excess acetic anhydride is removed by evaporation in vacuo and by codistillation with toluene. A solution of the residue in ether is filtered from a small amount of insoluble solid and treated with ethereal hydrogen chloride. The sticky hydrochloride that separates is repeatedly suspended in fresh ether for conversion to a clean crystalline solid. The product is recrystallized to constant mp from 200 ml. of hot diethyl ketone to give 20 g. of N-(3,4-dimethoxyphenethyl)-N-methyl acetamide, hydrochloride, m.p. 121–124°C.

Analysis: Calcd for C$_{13}$H$_{20}$ClNO$_3$:   C, 57.04; H, 7.36; Cl, 12.95; N, 5.15
Found:   C, 56.80; H, 7.11; Cl, 12.52; N, 5.22

The ir spectrum (KBr) exhibits bands at 3.41, 3.54 μ (aliphatic CH); 4.35, 4.90, 5.15, and 5.67 μ (broad salt bands); 6.06 μ (amide carbonyl); 6.28 and 6.60 μ (aromatic C=C); 6.94, 8.06, 8.61, 8.76, and 9.76 μ (aryl ether). The nmr spectrum (CDCl$_3$) has peaks δ 2.47 (s, 3), δ 2.95 (t,2, J=7 Hz), δ 3.16 (s, 3), δ 3,81 (t, 2, J=7Hz), δ 3.89 (s, 6), and δ 6.80 (s, 3).

EXAMPLE 6

The procedure of Example 1 is repeated, substituting for the acetoxyacetyl chloride stoichiometrical amounts of correspondingly substituted acyl halides and the following phenethylamides are obtained:

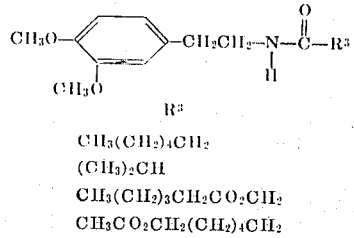

R$^3$
CH$_3$(CH$_2$)$_4$CH$_2$
(CH$_3$)$_2$CH
CH$_3$(CH$_2$)$_3$CH$_2$CO$_2$CH$_2$
CH$_3$CO$_2$CH$_2$(CH$_2$)$_4$CH$_2$

EXAMPLE 7

The procedure of Example 3 is repeated substituting for N-(p-chlorophenethyl)-2-hydroxyacetamide, acetate, stoichiometrical amounts of appropriately-substituted 2-hydroxyacetamide, alkanoates, and the following phenethylamides are obtained:

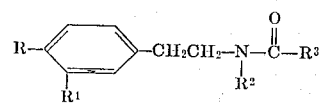

| R | R$^1$ | R$^2$ | R$^3$ |
|---|---|---|---|
| CH$_3$O | CH$_3$O | CH$_3$ | CH$_2$OH |
| CH$_3$O | CH$_3$O | H | CH$_2$CH$_2$OH |
| CH$_3$O | CH$_3$O | H | CH$_2$(CH$_2$)$_4$CH$_2$OH |

In evaluating the instant compounds for pharmacological activity, they are tested in vivo by standard methods with the following results.

The compound is administered to three mice (CF–1 14 to 24 grams) at each of the following doses: 400, 127, 40 and 12.7 mg./kg.

The animals are watched for signs of general stimulation, general depression and autonomic activity and the observations are evaluated by methods described in detail in Turner, *Screening Methods in Pharmacology*, Academic Press, New York, p. 80 (1965), in the section titled "A Test Group for Central Depressants."

N-(3,4-dimethoxyphenethyl)-2-hydroxyacetamide, administered orally suspended at 1% in an aqueous vehicle with polyethylene oxide sorbitan mono-oleate (p.o.), caused decreased motor activity and decreased respiration at 127 mg./kg., and administered intraperitoneally (i.p.) it caused decreased motor activity at 40 mg./kg. and decreased respiration at 127 mg./kg.; N-(3,4-dimethoxyphenethyl)glyoxylamide diphenylacetal, administered i.p., caused decreased motor activity and decreased respiration at 127 mg./kg.; N-94-chlorophenethyl)-2-hydroxyacetamide, acetate, i.p. and p.o., caused decreased motor activity and decreased respiration at 127 mg./kg.; N-(4-chlorophenethyl)-2-hydroxyacetamide, administered p.o., caused decreased motor activity at 40 mg./kg. and decreased respiration at 127 mg./kg.; and N-(3,-4-dimethoxyphenethyl)-N-methylacetamide hydrochloride, administered p.o., caused decreased motor activity at 12.7 mg./kg. and administered i.p., caused decreased motor activity at 40 mg./kg. and decreased respiration at 127 mg./kg. There were no deaths at he highest dose used, 400 mg./kg.

In a standard test for bronchodilator activity [modified from Siegmund et al., J. Pharmacol., 90, 254 (1947)] the ability of the compound to protect a guinea pig against the bronchoconstrictor effects of a histamine mist is determined. A 0.2 percent (base) histamine diphosphate solution is atomized and sprayed into a closed chamber for 60 seconds. The guinea pig is then placed into the chamber and observed for asphyxial effects. When convulsions are imminent, the pig is removed from the chamber and allowed to recover. The time from placing the pig in the chamber until convulsions are imminent is recorded and is designated pre-convulsion time. Five pigs are used and control times are obtained for each pig in the morning. Only pigs having control times in the range of 50–100 seconds are used in the test. After a 3.5 to 4 hour recovery period the pigs are administered the drug intraperitoneally and 15 minutes later are again exposed to the histamine aerosol. An animal that can withstand three times its morning preconvulsion time is considered completely protected. Individual control (C) and post drug convulsion times (T) are recorded and an activity value calculated by the formula, (T/C). A mean (T/C) value greater than 1.5 indicates activity.

In this test, N-(3,4-dimethoxyphenethyl)-2-hydroxyacetamide administered i.p. in saline had a T/C of 1.85 at 25 mg./kg. and 1.86 at 50 mg./kg.; N-(4-chlorophenethyl)-2-hydroxyacetamide, administered i.p. in saline, had a T/C of 1.53 at 50 mg./kg.; and N-(3,4-dimethoxyphenethyl)-N-methylacetamide hydrochloride, administered i.p. in saline, had a T/C of 2.37 at 25 mg./kg. and a T/C of 3.00 at 50 mg./kg.

We claim:
1. N-(3,4-dimethoxyphenethyl)-N-methylacetamide.
2. A compound as defined in claim 1 in the form of a hydrochloric acid addition salt.
3. N-(3,4-dimethoxyphenethyl)glyoxylamide, diphenylacetal.

* * * * *